(12) United States Patent
Carter et al.

(10) Patent No.: US 6,654,315 B1
(45) Date of Patent: Nov. 25, 2003

(54) SONAR DISPLAY SYSTEM AND METHOD

(75) Inventors: G. Clifford Carter, Waterford, CT (US); William A. Struzinski, New London, CT (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 10/166,224

(22) Filed: Jun. 5, 2002

(51) Int. Cl.[7] .................................................. G01S 3/80
(52) U.S. Cl. ...................................................... 367/124
(58) Field of Search ................................. 367/124, 123

(56) References Cited

U.S. PATENT DOCUMENTS

| | | | | |
|---|---|---|---|---|
| 3,713,087 A | * | 1/1973 | Bauer et al. ............... | 367/124 |
| 4,935,748 A | * | 6/1990 | Schmidt et al. ............ | 367/68 |
| 5,058,081 A | * | 10/1991 | Gulli et al. ................ | 367/123 |
| 5,216,640 A | * | 6/1993 | Donald et al. .............. | 367/124 |
| 5,251,184 A | * | 10/1993 | Hildebrand et al. .......... | 367/72 |
| 5,481,505 A | * | 1/1996 | Donald et al. .............. | 367/124 |

OTHER PUBLICATIONS

Zarnich, Afresh Look At Broadband Passive Sonar Processing, Mar. 1999, ASAP'99, pp. 99–104.*
Zarnich, Passive Acoustic Broadband Processing A Fresh Look, 1999, 25 Pages.*

* cited by examiner

*Primary Examiner*—Daniel T. Pihulic
(74) *Attorney, Agent, or Firm*—James M. Kasischke; Michael F. Oglo; Jean-Paul A. Nasser

(57) ABSTRACT

A system and method for displaying sonar data are disclosed. In a presently preferred embodiment, each of N channels from a beamformer are separately processed utilizing a pair of passive broadband detection processors such as SCOT processors and SPED processors. The output of each SCOT processor and each SPED processor are scaled, aligned, and then compared. The maximum scaled and aligned output from each pair of processors is selected for input to a bearing time history display.

15 Claims, 1 Drawing Sheet

FIG.

SONAR DISPLAY SYSTEM AND METHOD

STATEMENT OF THE GOVERNMENT INTEREST

The invention described herein may be manufactured and used by or for the Government of the United States of America for Governmental purposes without the payment of any royalties thereon or therefore.

CROSS REFERENCE TO RELATED PATENT APPLICATIONS

Not applicable.

BACKGROUND OF THE INVENTION (1) Field of the Invention

The present invention relates generally to sonar displays and, more particularly, to a system and method suitable for displaying the outputs of multiple broadband processors with different detection algorithms whereby each multiple broadband processor operates on N-channels of sonar data from a towed array.

(2) Description of the Prior Art

It is well known that submarines and other vessels may utilize different types of towed arrays of sonar sensors for receiving sonar data. The towed array may typically have some number, N, of channels wherein the number of channels is typically related to the number of sonar detectors in the array. For instance, there may be one channel output for each acoustic sensor input to provide for conservation of energy with respect to each sensor. Each channel output may typically be considered as a beam "pointed to" a particular listening direction. With fewer beam outputs, information is lost. With more beams, the outputs are merely interpolated values of the input set. So if, for example, there are N=10 sensor inputs, then there may be N=10 independent beam outputs steered in N=10 different directions.

The information is processed to determine various attributes of targets. For instance, bearing is a measure (as a function of time) of the angle to the target (or acoustic source) relative to true North or relative to the direction of the ship's heading. Bearing rate is the rate of change of the bearing with respect to time. High bearing rate contacts are close to the array and tend to be relatively easy to spot. With respect to relative bearings, low bearing rate contacts tend to fall into one of three categories: opening away, running on parallel velocity, or on a collision course.

For processing the data received by the particular type of towed sonar array, different types of broadband detection processing schemes may be used. Each type of broadband detection processing scheme will typically have different advantages and disadvantages depending on the particular type of scenario of use. However, in the past, the output of each broadband detection processing scheme has required a separate display format. Due to the difficulty of viewing two different displays concurrently or one at a time, it would be desirable to provide a single display, such as a single bearing versus time history display, whereby the relative advantages of each type of detection scheme are built into a single display format.

Patents that show attempts to solve the above and other related problems are as follows:

U.S. Pat. No. 5,481,505, issued Jan. 2, 1996, to Donald et al., discloses a method and apparatus for detecting, processing and tracking sonar signals to provide bearing, range and depth information that locates an object in three-dimensional underwater space. An inverse beamformer utilizes signals from a towed horizontal array of hydrophones to estimate a bearing to a possible object. A matched field processor receives measured covariance matrix data based upon signals from the hydrophones and signals from a propagation model. An eight nearest neighbor peak picker provides plane wave peaks in response to output beam levels from the matched processor. A five-dimensional M of N tracker identifies peaks within the specified limit of frequency, bearing change over time, range and depth to specify an object as a target and to display its relative range and depth with respect to the array of hydrophones.

U.S. Pat. No. 5,251,185, issued Oct. 5, 1993, to P. M. Baggenstoss, discloses an improved sonar signal processor and display combining the use of both coherent and incoherent signal processors. In addition to a conventionally used matched filter detection processor, an incoherent signal processor comprising a cross-range energy filter and a down-range energy filter is used. The cross-range energy filter detects objects characterized by a narrow bearing response; whereas the down-range energy filter detects objects characterized by a narrow range response. The detection events resulting from the incoherent signal processor are displayed in a subdued color to prevent distraction from the primary display events and to reduce the false alarm rate by allowing the sonar operator to view events in the context of natural boundaries.

U.S. Pat. No. 5,216,640, issued Jun. 1, 1993, to Donald et al., discloses an apparatus and method for detecting, processing, and tracking sonar signals. Plane wave energy from the sonar signal source is measured at multiple points using an array of plane wave energy receptors. These measurements are processed using an inverse beamformer to generate output beam levels. These output beam levels are then processed using the spectrum normalizer to yield spatially and spectrally normalized output beam levels. The normalized beam levels are then processed using an eight nearest-neighbor peak-picker to provide plane wave peaks. Finally, the plane wave peaks are processed by a three-dimensioned M of N tracker to identify peaks within a specified limit of frequency and angle change over time. The identified peaks may be displaced or recorded for further analysis.

U.S. Pat. No. 5,058,081, issued Oct. 15, 1991, to Gulli et al., discloses a method of formation of channels for a sonar after being sampled at a frequency $T=1/4f_0$ (where $f_0$ is the receiving center frequency of the sonar) the signals from the hydrophones of the sonar and having translated them to baseband, the signals thus translated are subsampled with a period $T_{SE}=kT$ (wherein k is an integer) substantially equal to 1.25 B, where B is the reception bandwidth of the sonar. A first set of signals is subsampled at identical times to form a frontal sector. Two further sets of signals are subsampled with delays between the signals from two adjacent hydrophones equal to T, which determines two side sectors adjacent to the frontal sector. The subsampled signals are then transmitted serially by the towing cable of the sonar device towed array and are processed in FFT circuits which allow to form in each sector a set of channels covering the sector. This allows to considerably reduce the data transmission rate between the towed portion of the sonar and the portion located in the towing ship.

U.S. Pat. No. 4,935,748, issued Jun. 19, 1990, to Schmidt et al., discloses a blast recorder and method for monitoring and processing vibrations from blasts, and for displaying the results in a nearly real time basis and in a manner which is easily interpreted by a relatively unskilled field worker and corresponds to a form which closely correspond to the real damage causing aspect of the blast than heretofore. The invention operates by receiving seismic energy signals from a blast sensor, processing the energy signals to obtain velocity signals relating to said blast, filtering either the energy signals prior to, or the velocity signals following said processing step, into high and low frequency bands, to obtain high and low band velocity signals, integrating over the period of the blast the high and low band velocity signals to obtain high and low band displacement signals, determining the peak velocity signal in each band, over the period of the blast, and displaying one or all of the peak of the velocity signal determined in the high frequency band, the peak of the velocity signal determined in the low frequency band, and the displacement signal related to the low frequency band.

U.S. Pat. No. 3,713,087, issued Jan. 23, 1973, to Bauer et al., discloses an acoustical detection apparatus for determining the direction of origin of sounds. A first acoustic receiving system having a relatively high uniform sensitivity in a predetermined plane and a relatively low sensitivity in and about the direction perpendicular to the plane is provided. A second acoustic receiving system having a spherical sensitivity pattern is also provided. The sensitivity of the second system is set substantially equal to the sensitivity of the first system in the predetermined plane. Means are provided for comparing the outputs of the first and second systems, the ratio of these outputs indicating the direction from which received sounds are arriving. In a preferred embodiment, of the invention, the first acoustic receiving system has a donut-shaped reception characteristic.

The above cited prior art which does not show a suitable means for combining the results of multiple broadband detection processing schemes to thereby produce a single display wherein the advantages of each type of broadband detection scheme are incorporated without the need for viewing multiple displays concurrently or consecutively. Those skilled in the art will appreciate the present invention that addresses the above and other problems.

SUMMARY OF THE INVENTION

Accordingly, it is an object of the present invention to provide an improved sonar system and method.

It is another object of the present invention to provide a system with one or more processes for combining the outputs from multiple broadband detection schemes.

It is yet another object of the present invention to provide a sonar operator with a single bearing versus time history display which is based on the outputs of two passive broadband detectors.

An advantage of a system in accord with the present invention is that it is less likely to miss an acoustic contact.

A feature of the present invention, in one embodiment, is the use of at least two detectors operating on data supplied through each sonar data channel to effectively split the data path whereby the data is processed in several ways simultaneously and subsequently recombined into one data path.

These and other objects, features, and advantages of the present invention will become apparent from the drawings, the descriptions given herein, and the appended claims. It will be understood that above listed objects and advantages of the invention are intended only as an aid in understanding aspects of the invention, are not intended to limit the invention in any way, and do not form a comprehensive list of objects, features, and advantages.

In accordance with the present invention, a system for displaying sonar data is provided which can comprise elements such as a sonar array with a plurality of sonar sensors and a plurality of data channels. The plurality of data channels can be split to form a plurality of first detector channels and a plurality of second detector channels. A plurality of comparators may be utilized for selecting an output from each of the first detector channels and each of the second detectors. A display can be provided for displaying a comparator output for each of the plurality of comparators. The plurality of comparators can in one embodiment each utilize a binary OR operation selecting from the first detector channel and the second detector channels. The OR operation can be of the type which selects a maximum value from each of the first detector channels as compared with each of the second detector channels when the outputs of the detector channels are not strictly binary.

The system can further comprise a plurality of first normalizers for the plurality of first detector channels, and a plurality of second normalizers for the plurality of second detector channels. The comparators can be used select a maximum output from the first normalizers as compared to the second normalizers. Preferably, the first detector channels and the second detector channels utilize different types of broadband detection schemes. In a preferred embodiment, each of the first detector channels utilizes a Smooth Coherence Transform (SCOT) processor and each of the second detector channels utilize a Sub-band Peak Energy Detection (SPED) processor. In one embodiment, the display is a bearing versus time history display.

A method is also provided for displaying the sonar data which may comprise one or more of the following steps such as processing sonar data through a plurality of data channels, splitting each of the plurality of data channels for processing by at least two different detection processors, recombining each of the split data channels to form a plurality of recombined data channels, and utilizing data from each of the plurality of recombined data channels for a display. The processing may comprise simultaneously utilizing a first detector and a second detector. The step of recombining may further comprise executing a binary OR operation on an output related to the first detector and the second detector to produce a plurality of OR outputs. Other steps may include displaying the plurality of OR outputs on the display and/or scaling the outputs of the first detector and the second detector prior to the step of executing the OR operation.

In one particular embodiment of the invention, a SCOT OR SPED (SOS) method is provided for displaying sonar data which may comprise one or more steps such as providing N channels of sonar data, detecting each of the N channels of sonar data with a plurality of SPED detectors, detecting each of the N channels of sonar data with a plurality of SCOT detectors, and producing channels of data for display by performing a binary OR operation between a SPED output for each respective SPED detector and a SCOT output for each respective SCOT detector for each of the N channels of sonar data. Other steps may include scaling and aligning each SPED detector output and each SCOT detector output prior to the step of performing the OR operation. The OR operation may comprise selecting a maximum of the SPED output as compared to the SCOT output. Other steps may include displaying the N channels of data for display in a bearing versus time history display format. Additional or alternative steps may include producing the N-channels of sonar data with a beamformer and applying data from a towed array with a plurality of sonar sensors to the beamformer.

BRIEF DESCRIPTION OF THE DRAWING

A more complete understanding of the invention and many of the attendant advantages thereto will be readily appreciated as the same becomes better understood by reference to the following detailed description when considered in conjunction with the accompanying drawing wherein corresponding reference characters indicate corresponding parts and wherein the FIGURE is a block diagram of a sonar processor system that may be used for processing sonar data to provide a sonar display in accord with the present invention.

DESCRIPTION OF THE PREFERRED EMBODIMENT

Figure 1:
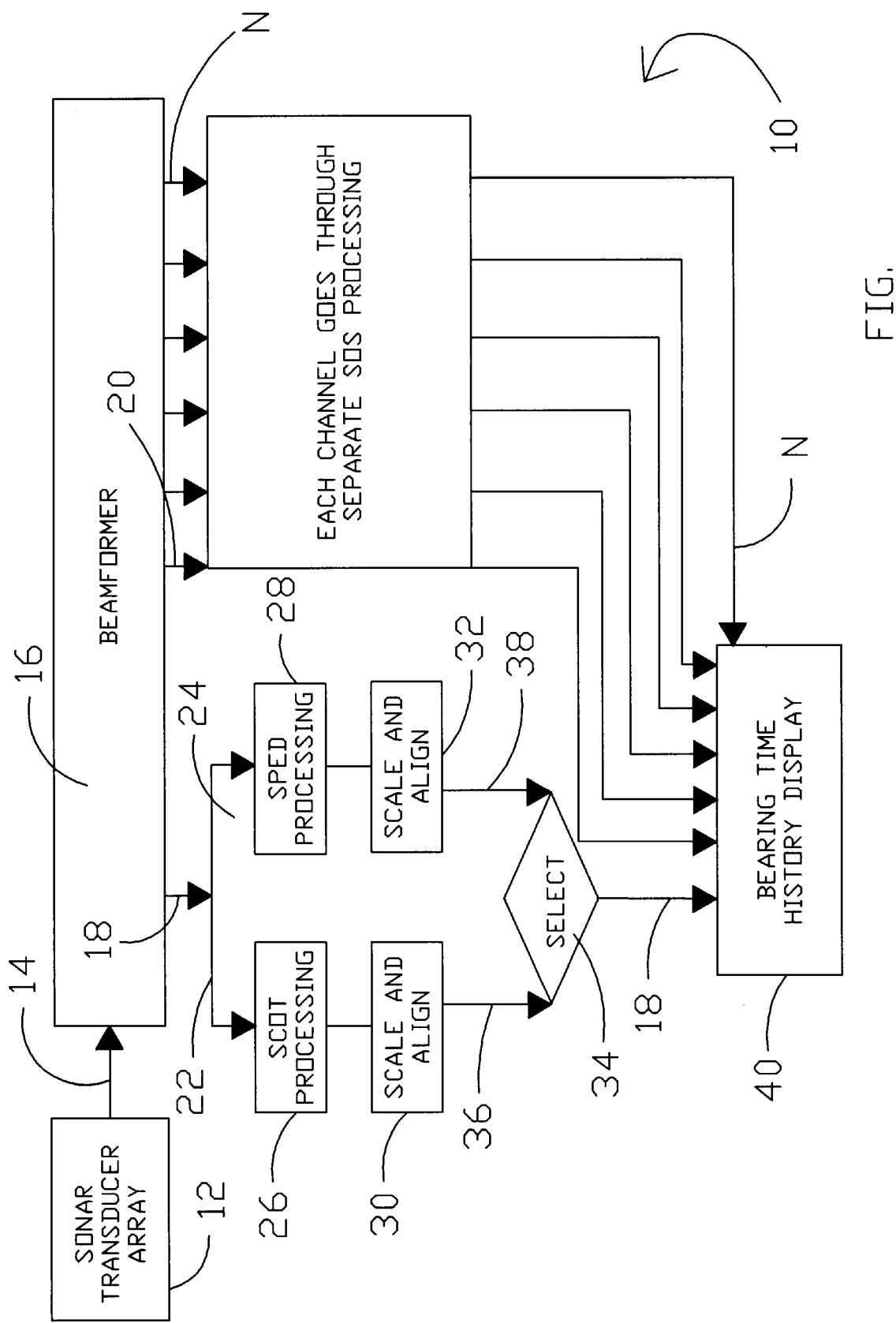

Presently, two types of passive broadband detection processing schemes are frequently favored for concurrent use in analyzing data from towed sonar arrays. One group of prior art detection processing techniques is referred to as Generalized Cross Correlation (GCC) methods. One type of GCC broadband detection processing is the Smoothed Coherence Transform (SCOT) cross correlation method; however, other types also exist in the prior art. Another group of prior art detection processing techniques are energy detection methods having frequency and time normalizations for display. These methods include the Sub-band Peak Energy Detection (SPED) method and the Sub-band Extrema Energy Detection (SEED) method. These two types of processing, as may presently be used with the invention, are discussed hereinafter in some detail for reference although other types of detectors such as, for instance, other types of broadband detection processing schemes, could also be used. Therefore, the present invention is not limited to use of SCOT processing and SPED processing.

Referring now to the FIGURE, where sonar system 10 in accord with the present invention is shown in a block diagram schematic for receiving signals received typically by reflection from objects in response to a transmitted sonar signal. The received signals are used to provide events or pings for display with such events corresponding to detected objects and providing data related to a range and a bearing of the detected object. Sonar system 10 includes sonar transducer array 12 for receiving the sonar signals. The present invention may be used with different types of sonar transducer arrays which can be towed by vessels such as a submarines and ships. Transducer array 12 is coupled via signal line 14 to beamformer 14. Beamformer 14 provides a plurality of outputs such as outputs 18, 20, and N. Beamformer 14 is a well known specialized electronic system that delays or adds the signals from individual hydrophone and provides these converted signals as outputs, such as outputs 18, 20, and N, that are electronically steered to a particular "look" direction. Outputs 18, 20, and N comprise streams of digital data taken at an initial sampling rate. Each output may typically correspond to a beam or lobe characterized by a predetermined interval of ranges and a given bearing.

In a preferred embodiment of the present invention, each output or channel, such as channel 18, is split as shown into two paths, such as paths 22 and 24, respectively. The particular inputs used by processors 26 and 28, discussed hereinafter, can be time domain complex full beam data, time domain complex half beam data or the like, if desired. Thus, in the present invention, each channel is processed separately utilizing two different processing schemes. In a preferred embodiment, the combination of SCOT processing and SPED processing is used for processing data from each channel as indicated at 26 and 28. Thus, in the embodiment shown in the FIGURE, each channel is processed at least twice in a parallel fashion prior to a subsequent recombination as discussed hereinafter. However, it will be understood that additional or different broadband processing schemes can be used such that the present invention can accommodate multiple parallel processing schemes whereby the outputs are then further processed as discussed hereinafter.

As indicated above, at least two detection algorithms are normally required because the performance of each algorithm is scenario dependent. For instance, SPED outperforms SCOT for static and low bearing rate targets, but SCOT outperforms SPED for high dynamic targets and two closely spaced targets in bearing. "Low bearing rate" may considered to be a bearing rate at most 6 degrees/minute or otherwise defined. "High bearing rate" may be considered to be a bearing rate at least 12 degrees/minute unless otherwise defined. Two targets might be considered closely spaced, as used herein, if they have a bearing separation of no more than two beams. For instance, suppose there are M=10 beams over 180 degrees then each beam width is nominally 18 degrees. In this case it may be desirable to resolve targets or acoustic contacts less than, say, for M=10, 180/M=18 degrees.

The SCOT detection scheme and the SPED detection scheme are each preferably displayed in the form of a bearing versus time display. Since the SCOT detector and SPED detector react differently in different scenarios, it is desirable to utilize information from both types of detectors. Therefore, two displays are required in the prior art, one for SCOT and one for SPED. Previously, the sonar operator would need to view either the SCOT display or the SPED display one at a time or both concurrently to determine if targets of interest are present.

The particular embodiment of the SCOT processing preferably used with the present invention provides for an input to the SCOT processing which is time domain complex half beam data. The SCOT processing consists, in a preferred embodiment, of eight subfunctions: 1) Fast Fourier Transform (FFT) processing, 2) Power Spectrum Estimation, 3) Weight, 4) Cross Spectrum, 5) Time Integration, 6) Complex Multiple, 7) Complex-to-Real Inverse FFT, and 8) Display Cell Interpolation. A description of each subfunction is given.

The FFT processing subfunction converts the complex half beam data to the frequency domain. The FFT operation is preferably performed four times for the shortest time update interval, as discussed below.

The Power Spectrum Estimation subfunction consists of four steps: 1) Hanning Windowing, 2) Square Law Detector, 3) Sum-and-Dump Integration, and RC Integration. Each of these steps will now be described. A Hanning window is applied to the forward and aft FFT data blocks that were generated in the FFT processing subfunction. The window used is a modified Hanning window that is normalized in power and to compensate for the complex-to-real inverse FFT. A square law detector is then applied to the Hanning windowed FFT data and followed by a sum-and-dump integrator. The square law detector takes the magnitude squared of the data. The data is time averaged (sum-and-dump integrator) to three time update intervals, IT2, IT3, and IT4. These time update intervals are chosen based on the frequencies or frequency range of interest. The RC Integration step is performed only when the sum-and-dump integrated data matures. A recursively smoothed average is calculated using the RC integrator.

The next subfunction performed after Power Spectrum Estimation is Weight. This subfunction computes weights using the power spectrum estimates and the low and full band filters. The weights are computed for the IT2, IT3, and IT4 integration times. The Cross Spectrum subfunction performs the conjugate multiplication of the forward and aft half beam pairs. The Time integration subfunction time averages the normalized cross spectrum estimates to the IT2, IT3, and IT4 data rates. The Complex Multiple subfunction applies the weights calculated in the Weight subfunction to the cross spectrum data from the Cross Spectrum subfunction. The next subfunction is Complex-to-Real Inverse FFT, which converts the normalized complex cross spectrum back to the lag domain for display cell interpolation processing. The final subfunction is Display Cell Interpolation. Time delays corresponding to each of the display cells are computed based upon the speed and sound and phase center displacement values. Then interpolation in beam space and lag domain is performed. The output of the SCOT processing 26 is applied to scale and align element 30 as discussed subsequently. The output may comprise some discrete number of bearing cells, say for instance 401.

The particular embodiment of the SPED processing as used in accord with the present invention preferably has inputs at 24 comprised of time domain full beam data. The SPED processing as preferably used herein may consist of nine subfunctions: 1) Time Domain Weighting such as Hanning (or Hamming, triangular, etc.), 2) Fast Fourier Transform (FFT) Processing, 3) Frequency Bin Selection, 4) Magnitude Squared Detection, 5) Time Integration, 6) Noise Power Estimation, 7) Azimuthal Peak Detection and Fine Bearing Calculation, 8) Peak Integration, and 9) Azimuthal Smoothing. Describing each subfunction in more detail, a Hanning window may be applied to the 50% (or variable depending on processing power available and weighting/ window selected) overlapped complex time series beam data. FFTs are performed at the IT2 data rate using the Hanning windowed data. A total of N beams by some number of frequency bins (~1024) are produced. In order to decrease the number of computations through the rest of the processing, frequencies outside a selected frequency range of interest are dropped from processing. The output of Frequency Bin selection subfunction is N beams by some number of bins (~720 IT2 FFT data). Each beam's frequency spectrum is then magnitude-squared bin by bin for IT2 truncation frequency spectra. The IT2 squared magnitude data are time averaged to the IT3 (IT3=4*IT2) and IT4 (IT4=3*IT3) data rates. The integrators are sum-and-dump integrators. The next subfunction performed is Noise Power Estimation. This subfunction consists of three steps: 1) Time Smoothing, 2) Tone Removal, and 3) Quiet Beam Selection. The Time Smoothing step obtains a mean for each beam and bin by computing a running average of the most recent 12 IT2 samples. If the current time cycle is IT4, the IT4 data is used as the time average. The Tone Removal step obtains a noise mean estimate for each beam by using the split two pass mean normalizer algorithm. At each frequency, the second quietest beam within a specified azimuthal sector is selected as representative of the noise at the center of the sector. The next subfunction performed after Noise Power Estimation is Peak Detection and Fine Bearing Calculation. For each frequency bin, if the amplitude is greater than the corresponding bin in each of the adjacent beams, then that frequency bin is considered the peak. The bearing is then computed for each peak using a parabolic fit. The subfunction is performed for the IT2, IT3, and IT4 data. The Peak Integration subfunction takes the IT2, IT3, and IT4 data from the Peak Detection and fine Bearing Calculation subfunction and integrates it across the frequency. Prior to integration, the data are normalized by the squared of the noise value from the second quietest beam. The last subfunction is Azimuthal (i.e., bearing) Smoothing. This subfunction is performed on the integrated data by sliding an averaging window over the azimuthal cells. The output of the SPED processing is estimated power as a function bearing for some discrete number of bearing cells, say for instance 401, of smoothed data. This process is repeated as time progresses.

Output from SPED processing 30 is also applied to a scale and align section such section 32. The outputs of the SCOT 32 (or other Generalized Cross Correlation, GCC, function) are a function of delay and have a wide range of amplitudes. Unlike the normalized cross correlation function which goes between minus unity and plus unity, the GCC functions like the SCOT can have larger extremes. On the other hand the SPED (and its variant the SEED) can have different extremes. Also the SPED (or SEED) are a function of bearing (which is related to delay by a cosine trigonometric function). Scale and align 30 converts the SCOT processing output to the same abscissa as the SPED. Then both outputs are delay or both outputs are bearing. Scaling as indicated at 30 and 32, is an attempt to have a common or consistent amplitude normalization. One possible method for achieving this purpose, for example only, might be to normalize each scan so that the maximum was unity and the minimum was zero. However, it will be understood that there are a variety of possible methods of normalizing, including single pass and multi-pass sector space averagers.

Outputs 36 and 38 for Scale and Align elements 30 and 32 are applied to select element 34 which preferably performs a comparing and selecting function. In select element 34, a selection is made from outputs 36 and 38 to determine how data from outputs 36 and 38 will be displayed. In a preferred embodiment, the desired scaled and aligned output 36 of SCOT 26 and the scaled and aligned output 38 of SPED 28 are selected through the process of being OR-ed together for each channel. OR-ing, as used herein, is preferably the process of selecting the maximum in select 34 for each of the channels. In this example, the maximum will be the maximum of outputs 36 and 38 for each channel. The Boolean Algebra mathematical function called "OR-ing," as presently used herein, can be designed to capture a maximum of output one or output two (or other detector outputs, if used). Thus, if either sub-system of the total system makes a detection, the system will declare an object present. In this way, one is guaranteed the best of performance of either of the two sub-systems. A significant advantage of such a system is that it is less likely to miss an acoustic contact. While OR-ing is the presently preferred comparing or selection means, other Boolean operators (NOR, NAND, AND) or combinations of Boolean operators, as well as other types of comparators and/or mathematical operators could also conceivably be utilized. Scenario dependent feedback could also be supplied to select element 34 or other means for controlling select element 34 could be utilized.

Thus, each channel 18, 20, . . . N, will now have an output and be applied to section 40 for display. The display will be produced in accord with principles previously used in displaying data such as the SCOT or SPED. Therefore the presently preferred output from select module 34 is SCOT or SPED which is herein referred to as SOS. The SOS system, method, or algorithm eliminates the need for two different displays to be viewed either concurrently or consecutively by a sonar operator. Therefore, sonar operator overload is reduced. Furthermore, since the sonar operator needs to view only one display, the time required to determine if targets of interest are present is reduced.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A system for displaying sonar data from a plurality of beamformer output channels, comprising:

a plurality of first detectors, each having a first detector input and a first detector output, and each first detector input being joined to one channel of said plurality of beamformer output channels;

a plurality of second detectors, each having a second detector input and a second detector output, and each second detector input being joined to one channel of said plurality of beamformer output channels;

a plurality of comparators, each having comparator inputs joined to one first detector output and one second detector output, and a comparator output for providing a selected output from said comparator inputs; and a display joined to said plurality of comparator outputs.

2. The system of claim 1, wherein said plurality of comparators each utilize a binary OR operation for selecting the comparator output from said first detector output and said second detector output.

3. The system of claim 1, wherein said plurality of comparators are each operable for selecting a maximum value as the comparator output from said first detector output and said second detector output.

4. The system of claim 1, wherein said first detectors and said second detectors utilize different types of broadband detection schemes.

5. The system of claim 4, wherein:

said first detectors utilize a generalized cross correlation detection scheme; and said second detectors utilize a display adapted energy detection scheme.

6. The system of claim 5 wherein said generalized cross correlation detection scheme comprises a smoothed coherence transform detection scheme.

7. The system of claim 5 wherein said display adapted energy detection scheme comprises a scheme selected from a sub-band extrema energy detection scheme and a sub-band peak energy detection scheme.

8. The system of claim 1, wherein said display provides a bearing versus time history display.

9. A method for displaying beamformed sonar data from a plurality of channels, comprising the steps of:

splitting each of said plurality of beamformed sonar data channels;

processing each split data channel in at least two different detection processors;

recombining each of said split processed data channel into a plurality of recombined data channels; and displaying said plurality of recombined data channels.

10. The method of claim 9, wherein said processing comprises simultaneously processing said split data channel in each processor.

11. The method of claim 10, wherein said step of recombining comprises performing a binary OR operation among said split processed data channels to produce a plurality of recombined data channels.

12. The method of claim 11, further comprising scaling each said split processed data channel prior to said step of recombining.

13. The method of claim 10, wherein said step of processing each data channel comprises:

performing generalized cross correlation processing on one part of each split data channel; and performing display adapted energy detection processing on another part of each split data channel.

14. The method of claim 13 wherein said generalized cross correlation processing comprises SCOT processing.

15. The method of claim 13 wherein said display adapted energy detection processing comprises processing by a method selected from sub-band extrema energy detection and sub-band peak energy detection.

* * * * *